March 14, 1939. R. T. PITT 2,150,588
LINER FOR COFFEE GROUNDS HOLDERS OF COFFEE MAKERS
Filed March 13, 1935

Inventor
Ralph T. Pitt
by Wright, Brown, Quinby & May
attys.

Patented Mar. 14, 1939

2,150,588

UNITED STATES PATENT OFFICE 2,150,588

LINER FOR COFFEE-GROUNDS HOLDERS OF COFFEE MAKERS

Ralph T. Pitt, Quincy, Mass., assignor to General Paper Products Corp., Boston, Mass., a corporation of Massachusetts Application March 13, 1935, Serial No. 10,822

1 Claim. (Cl. 53—3)

This invention relates to liners for the coffee-grounds holders of coffee-makers, for instance, such coffee-makers as are generally known as percolators or dripolators. The invention is inclusive not only of the liner itself as an article of manufacture but also of the combination of the liner with the coffee-grounds holder.

The coffee-grounds holder of a coffee-maker generally consists of a cylindrical metal cup whose bottom is finely perforated to permit the boiling water employed in making coffee to extract the coffee grounds and to percolate or drip freely therethrough to the coffee reservoir while the coffee grounds are substantially completely retained therein. The cleaning of the coffee-grounds holder is a considerable nuisance, for the extracted coffee grounds are soggy and tend to stick to the bottom and walls of the holder so that even though most of the grounds may be dumped, there is a substantial residue of grounds clinging to the bottom and walls that must be flushed or washed out at the sink, in consequence of which dishes in the sink, the sink itself, and the sink drain are subject to fouling.

The present invention makes possible a ready and efficient disposal of substantially all of the coffee grounds put into the coffee-grounds holder of a coffee-maker and, accordingly, does away with the aforementioned nuisance. This result is achieved pursuant to the present invention by providing the coffee-grounds holder of the coffee-maker with the paper receptacle which lines the bottom and walls of the holder and whose bottom is finely perforated to permit the coffee extract to flow freely therethrough while substantially completely retaining the coffee grounds therein. Because of the low cost of such a receptacle or liner, a fresh receptacle may advantageously be used to line or protect the coffee-grounds holder with each coffee-making operation, the receptacle being placed in the coffee-grounds holder to line or cover substantially completely the bottom and walls of the holder, coffee-grounds charged thereinto in the desired amount, the coffee prepared, and the receptacle together with its charge of extracted grounds finally removed from the holder and discarded. Because ordinary paper tends to disintegrate, especially under the action of boiling water, it is preferable that the receptacle or liner of the present invention be made of paper of high wet strength, that is, paper which remains intact and substantially undistorted so that it can be handled even after having undergone prolonged contact with boiling water. There are various kinds of papers possessed of the requisite high wet strength and other qualities, including papers impregnated with regenerated cellulose, with waxes of high melting point, and with other water-insoluble agents that maintain the integrity of the paper while wet and do not affect the quality of the coffee, but it is preferable that so-called vegetable parchment, e. g. "Patapar", be employed for this purpose on account of its low cost coupled with its high purity or freedom from substances tending to affect in any sensible measure the aroma or taste of the coffee. It is thus seen that the papers, such as the vegetable parchment or the impregnated papers, used for the receptacle or liner of the present invention while being possessed of the required non-disintegrating or non-distorting properties in contact with hot water affords a comparatively non-porous or non-filtering medium and that it is by virtue of the apertures punched through the bottom of the receptacle that the desired drainage or percolation of hot water or coffee extract through the receptacle is realized.

With the foregoing and other features and objects in view, the present invention will now be described in further detail with reference to the accompanying drawing, wherein,—

Figures 1, 2:
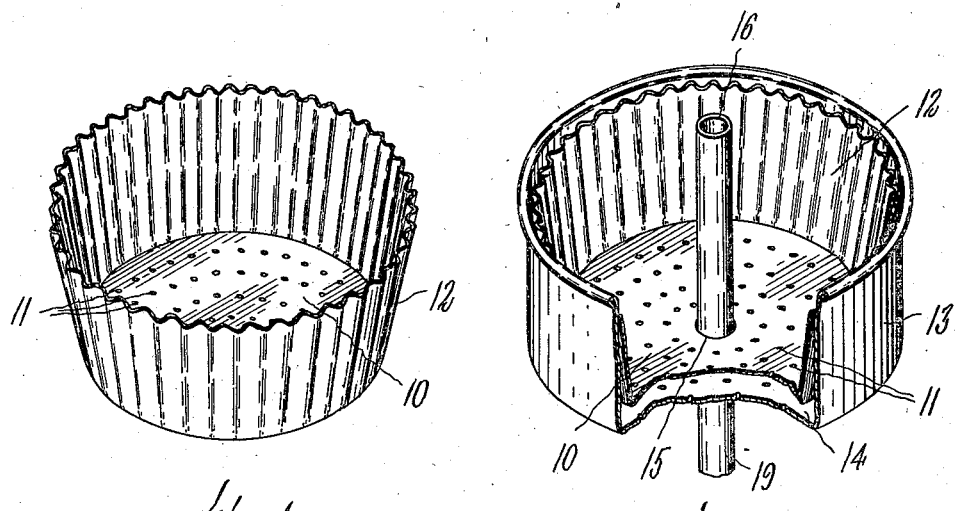
Figure 1 shows in perspective a paper liner or receptacle embodying the present invention.
Figure 2 shows the liner in assembly with the coffee-grounds holder of the usual coffee percolator, part of the holder and liner being broken away to show to good advantage the assembly.

As shown in Figure 1, the paper liner or receptacle of the present invention may be formed from a one-piece blank and may assume a generally cylindrical or cup-shaped form similar to that of the coffee-grounds holder in which it is adapted to be placed. The bottom 10 of the liner is provided with a multiplicity of fine apertures or perforations 11 arranged as in concentric rows so as to permit the coffee or aqueous extract to flow freely therethrough at substantially regularly spaced intervals. The apertures are sufficiently fine to permit retention of substantially all of the coffee grounds within the liner. The side walls 12 of the liner are, as shown, preferably fluted or corrugated but substantially imperforate so as to impart desired rigidity thereto even when the paper of which the liner is composed is quite thin and flexible. The corrugations serve the additional desirable function of keeping the side walls largely out of contact with the walls of the coffee-grounds holder and thus of preventing undue sticking of the liner to the holder such as might render difficult the removal of the used liner without its being torn and/or so distorted as to result in undesirable or untimely spilling of the extracted coffee grounds.

The paper liner appears in Figure 2 in operative position within the coffee-grounds holder 13 of the usual coffee percolator. The holder may be the usual cylindrical or cup-shaped metal container whose bottom 14 is finely perforated to permit the aqueous extract to flow freely therethrough. The bottom 10 of the paper liner is shown reposing on and covering substantially all the inner surface of the bottom 14 of the holder and the side walls 12 of the liner are shown covering or protecting substantially all the inner wall surface of the holder. In other words, the liner may be of dimensions corresponding substantially to those of the holder so that it will fit nicely into the holder and line it substantially throughout. Of course, the bottom 10 of the liner should be provided with a central opening 15, as is the holder 14, to permit its being pushed down into operative position in the holder over the vertical circulating spout 16 of the percolator.

Figure 4:
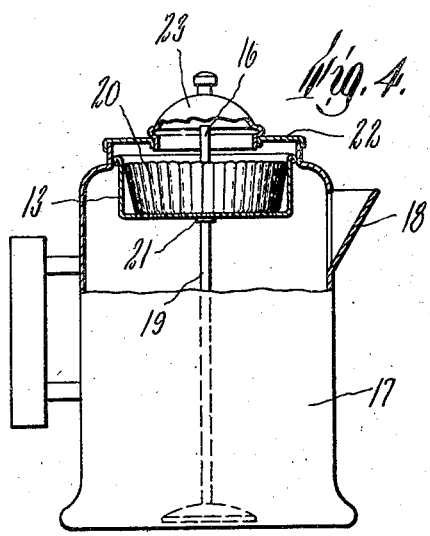
Figure 4 is a similar view of a coffee-maker of the percolator type, the coffee-grounds holder together with the liner of the present invention also being shown in section.

A conventional type of coffee percolator containing therein the paper liner of the present invention is shown in Figure 4 and includes the kettle or pot 17 having a pouring nozzle 18. The water in the course of boiling in the pot is circulated by a vertical circulating tube 19 from the bottom of the pot and out of the spout 16 onto the coffee grounds in the present paper liner 20 of the present invention, which is shown fitted into the coffee-grounds holder 13. The coffee-grounds holder may be removably supported on the usual annular flange 21 projecting from the circulating tube 19. The top of the kettle may be closed by a hinged cover 22 equipped with the familiar dome-shaped sight-glass 23. When the percolator is to be cleaned, the liner 20 together with its charge of extracted coffee grounds is removed from the holder 13 and discarded; and the percolator, including its holder 13, may be washed without creating a nuisance, since there are no coffee grounds therein.

Figure 3:
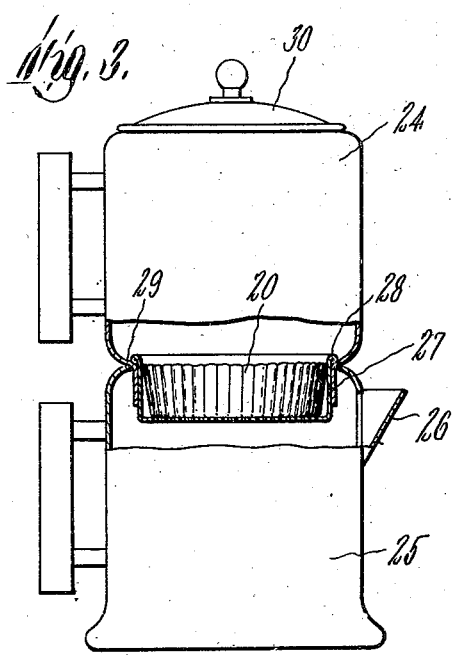
Figure 3 is a front elevation of a coffee-maker of the dripolator type, the coffee-grounds holder together with the liner of the present invention being shown in section.

The dripolator type of coffee-maker shown in Figure 3 includes an upper compartment or section 24 removably fitted into a lower compartment or section 25 in which the coffee is collected and from which the coffee may be poured from a nozzle 26. The coffee-grounds holder 27 may be inserted through the open top of the upper compartment 24 and by its beaded or flanged rim 28 be supported by the lower end portion of the upper compartment at an inturned portion 29 at which the upper compartment assumes a somewhat restricted cross section and projects part way into the lower compartment. The paper liner 20 of the present invention together with its contents of coffee grounds may be placed within the holder 27 and boiling water for making the coffee may be poured into the compartment 24 and permitted to drip or drain through the coffee grounds into the lower compartment 25. The paper liner 20 need not in such case be provided with a central opening 15 in its bottom. Of course, the entire upper compartment 24 may be disassembled from the lower compartment 25 immediately after extraction of the coffee grounds has been effected, thus permitting a disposal of the liner 20 and its contents and a washing of the upper compartment, including the coffee-grounds holder, while the lower compartment still contains the coffee.

While the paper liner or receptacle of the present invention has especial utility in connection with small coffee-makers such as are used in the household, it may also be applied to the large coffee-makers employed in restaurants when such latter coffee-makers comprise perforated coffee-grounds holders serving the same purpose as those illustrated on the drawing.

For convenience of designation, the expression "vegetable parchment paper" is used in the appended claim as including not only the usual vegetable parchment paper, such as "Patapar", but the various other or equivalent kinds or compositions of papers hereinbefore described as being useful, by reason of their high wet strength or integrity in wet condition, for the purpose of affording the disposable liner member of a coffee-grounds holder, in conformity with the present invention.

I claim:—

The combination with a substantially cylindrical, perforated, coffee-grounds holder of a coffee-maker of a one-piece, substantially cylindrical, vegetable parchment paper liner overlying the walls and bottom of said holder, the bottom of said liner containing fine openings punched therethrough through which coffee extract may freely pass, the side walls of said liner being substantially imperforate but being corrugated to be largely out of contact with the side walls of said holder and thus to facilitate removal of said liner while wet with its charge of extracted coffee-grounds in intact condition from said holder.

RALPH T. PITT.